Figure 1:
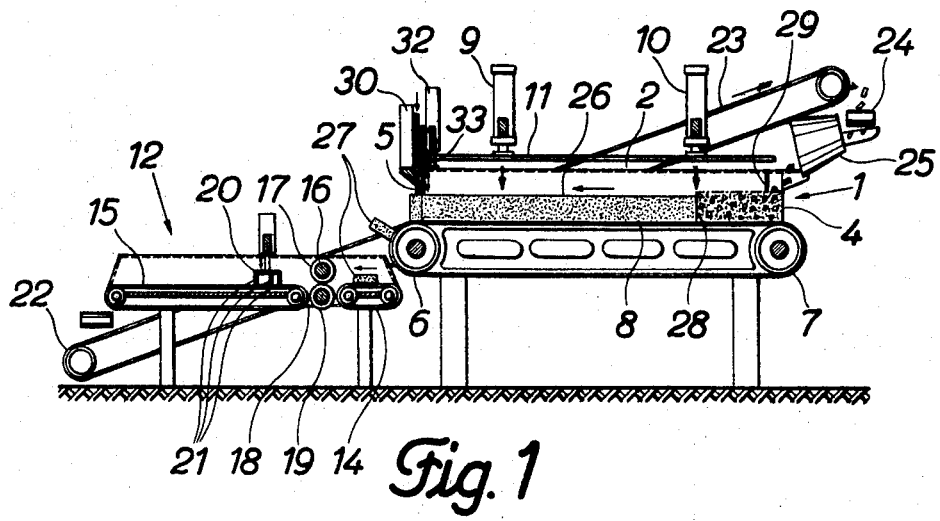

United States Patent [19]
Syrjanen et al.

[11] 3,707,769
[45] Jan. 2, 1973

[54] DEVICE FOR MANUFACTURING CHEESE OF CHEDDAR TYPE

[75] Inventors: Eero Syrjanen, Tampere; Olavi Reijonen, Helsinki, both of Finland

[73] Assignee: MKT-tehtaat Oy, Helsinki, Finland

[22] Filed: Dec. 14, 1970

[21] Appl. No.: 97,957

[52] U.S. Cl. .................................................. 99/460
[51] Int. Cl. ......................... A01j 25/08, A01j 25/15
[58] Field of Search......................... 31/46, 47, 89, 44

[56] References Cited

UNITED STATES PATENTS

| | | | |
|---|---|---|---|
| 3,060,575 | 10/1962 | Czulak | 31/47 |
| 3,071,860 | 1/1963 | Sjoholm et al | 31/46 |

FOREIGN PATENTS OR APPLICATIONS

| | | |
|---|---|---|
| 1,337,086 | 7/1963 | France |

*Primary Examiner*—Hugh R. Chamblee
*Attorney*—McGlew and Toren

[57] ABSTRACT

The invention relates to an improvement in a device for manufacturing Cheddar-type cheese, consisting of a cheddarising or ripening tank, a mincing device for the ripened cheese, a salting device for the minced cheese, a cheese press and conveyors for transporting the cheese from one phase to another. The invention is characterized in that the ripening tank consists of a tank known in itself in the manufacturing of other types of cheese, which has been provided with a perforated bottom moving from the initial to the ultimate end of the tank, with a press plate placed above and with a cutter for cutting the cheese mattress which rests upon the bottom, and that the device comprises a conveyor extending from the ultimate to the initial end of the tank for feeding the minced and salted cheese once more into the same tank and for ultimate pressing of the cheese in said tank.

3 Claims, 2 Drawing Figures

PATENTED JAN 2 1973　　　　　　　　　　　　　　　　3,707,769

INVENTORS:
EERO SYRJÄNEN
OLAVI REIJONEN
BY
McYoung + Toren
ATTORNEYS

DEVICE FOR MANUFACTURING CHEESE OF CHEDDAR TYPE

Manufacturing of Cheddar-type cheese takes place by the procedure that in a cheese kettle coagulation of the cheese curd is accomplished. The cheese mass, which thus consists of the curd and of whey, is poured from the cheese kettle into a cheddarizing or ripening tank. The tank retains the curd but lets the whey escape. The cheese mattress remaining on the bottom of the tank is left in the tank for 1-2 hours, in which time the bacterial activity causes in the cheese the sour taste characteristic of Cheddar-type cheese. The cheese mattress is cut into pieces by hand, and the pieces are repeatedly turned in the tank, in order to set free any whey, gases and air that have remained in the mattress.

The pieces cut from the cheese mattress are transferred to a conveyor and thence further to a mincing device, which cuts the pieces to small pieces about finger-size.

The minced cheese is transferred to the slating device, which usually consists of a drum rotatable about its axis, in which salt is fed among the cheese pieces.

The minced and sated cheese is packed into moulds having a size which is consistent with the size of the ultimate cheeses, and in which the cheeses are finally pressed. The pressing period is several hours or as much as a couple of days. The pressed cheeses are transferred into storage, where they ripen for several months.

Several considerable drawbacks are associated with the manufacturing process of Cheddar-type cheese described above. For instance, the cutting of the cheese mattress into pieces in the ripening tank, the turning of the pieces and their transfer to the conveyor require a great amount of manual work. Furthermore, the final pressing of the cheeses in separate moulds requires that a great number of moulds are available because the cheeses must remain under pressure for several hours or even up to two days. The initial cost of these moulds alone is considerable. But in addition it is necessary to provide in the cheese dairy a special pressing department, with presses. Apart from these capital costs, considerable running costs arise from maintenance of the moulds and from their washing after each use.

The aim of the present invention is to simplify substantially the equipment needed in the manufacturing of Cheddar-type cheese. The invention thus has reference to a device for manufacturing Cheddar-type cheese, consisting of a cheddarizing or ripening tank, a device for mincing the ripened cheese, a device for salting the minced cheese, a cheese press and conveyors for transporting the cheese from one phase to another.

A device according to the invention is characterized in that the ripening tank consists of a tank known in itself from the manufacturing of other types of cheese, which has been provided with a perforated bottom movable from the initial to the ultimate end of the tank, with a press plate located above and with a cutter for cutting the cheese mattress which rests upon the bottom, and in that the device comprises a conveyor extending from the ultimate to the initial end of the tank for reintroduction of the minced and salted cheese into the same tank and for final pressing of the cheese in said tank.

According to the invention the cheese goes into the tank twice. The first time the tank operates as ripening tank, and the second time it serves as press for the final pressing of the cheese. In both instances the cheese is in the form of a large mattress, which is an essential feature of the present invention. After the cheese mattress has been finally pressed, it is cut with a cutter into cheeses of ultimate size, which are taken into storage to ripen. No separate cheese moulds or presses are thus required. The manual work in the manufacturing of cheese has been completely eliminated.

Figure 2:
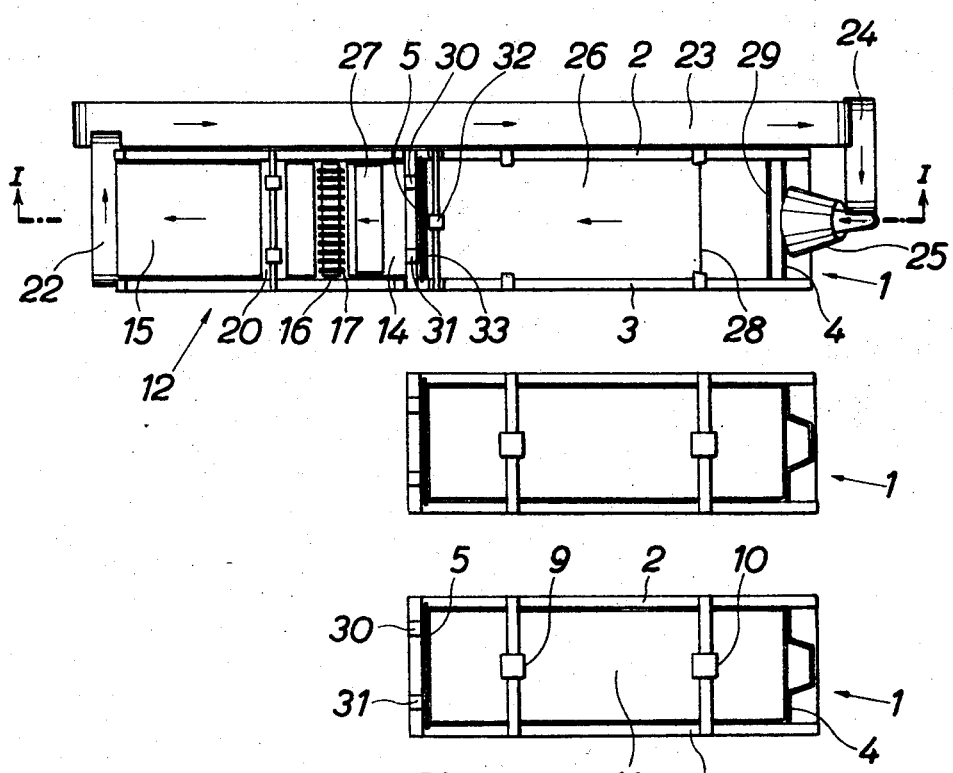

The invention is described in the following with reference to the attached drawing, in which FIG. 1 presents a device according to the invention in longitudinal section, and FIG. 2 presents, viewed from above, three tanks placed side by side.

The tank 1 has rectangular shape and a length of several meters The tank is confined by side walls 2 and 3 and end walls 4 and 5. The end walls and possibly also the side walls are perforated so that the whey may run off. The end wall 5 at the ultimate end of the tank 1 has according to FIG. 1 been raised into its upper position with the aid of power cylinders 30 and 31. At the ultimate end of the tank 1 there has been placed the cutter 33 which is movable by means of powder cylinder 32. The bottom of the tank consists of an endless wire 8 passing over drums 6 and 7, and which may consist of perforated metal strip, metal fabric, textile fabric or equivalent, through which the whey may flow. The drum 6 is the traction drum. Above the tank 1 there has been placed a press plate 11 movable with the aid of power cylinders 9 and 10 in vertical direction. The lower surface of this plate is perforated so that the whey may flow off during the pressure period.

After the ultimate end of tank 1 there has been placed the cheese mincing device 12. This consists of conveyors 14 and 15, between which there is a press roll pair 16, 18, which has been provided with disk-like cutters 17, 19. The distance of rolls 16 and 18 with reference to each other can be changed. It is not absolutely necessary for both rolls to have cutters if the cutters of one roll extend up to the other roll. There may also be several pairs of press rollers, of which part may be without cutters. After the rolls 16 and 18, there has been placed above the conveyor 15 and movable in vertical direction, the cutter 20, which has three cutting elements 21 transversal to the conveyor, the distances between which are mutually different. The number of cutting elements 21 may naturally vary, so that it is one or several. If there are more than one cutting element, it is advantageous to make their distances such that they can be varied.

After the mincing device 12 there has been placed a transversal conveyor 22 and, after this, an obliquely upwardly travelling conveyor 23, which extends up to the initial end of the tank. After this comes again a transversal conveyor 24 and, further, the salting device 25, which consists of a drum rotatable about its axis and having the shape of a cone widening from the initial to the ultimate end. The salting device 25 is positioned immediately above the initial end of the tank 1.

With a device according to the invention, Cheddar-type cheeses are manufactured as follows. Into the tank 1 from the cheese kettle (not depicted) cheese mass is introduced, which consists of the cheese curd and of whey. At this stage the end wall 5 of the tank 1 is closed, or in its lower position. The whey flows out through the wire 8 and the perforated surfaces of end walls 4 and 5 and possible also of the side walls 2 and 3, that is through the sieves, and the cheese curd forms on the bottom of the tank a cheese mattress 26, which may have a height of as much as 40–50 cm, or considerably more than in previously known devices. After the major part of the whey has run off, the cheese mattress 26 is prepressed with the press plate 11 to enhance the removal of whey, gases and air and to condense the cheese mattress so that cheddarizing may be initially rapidly and effectively.

After the desired degree of cheddarization has been achieved, the power cylinders 30, 31 are used to lift the end 5 of the tank 1 up, and the wire 8 is set in motion so that the cheese mattress 26 begins to move towards the left in FIG. 1. From the mattress pieces 27 are cut with the cutter 33, which have a length equal to the width of the tank. The thickness of the pieces 27 is determined by the ratio of the speeds of wire 8 and cutter 33. The pieces 27 fall upon the conveyor 14 and come into the gap between the rolls 16 and 18. The rolls squeeze the pieces so that further whey, gases and air are removed from them. At the same time the disk-like cutters 17 and 19 on the rolls 16 and 18 cut the pieces 26 up into strips. The strips come under the cutting elements 21 of the vertically movable cutter 20 and are cut across into approximately finger-sized small pieces. Since the distances between the cutting elements 21 are different, the length of the small pieces varies. Such pieces stick together better than pieces of equal size when they are later pressed together to form cheeses.

The small pieces go from above the mincing device 12 to the transversal conveyor 22, from which they are further transferred to the oblique conveyor 23, which returns the minced pieces to the initial end of the tank 1. The small pieces fall from the conveyor 23 onto transversal conveyor 24 and from this further into the salting device 25. After passage through the salting device, the small pieces fall once more into the initial end of tank 1 and form on the bottom of the tank again a cheese mattress. In order that the mattress might become uniform, a stop plate 29 is placed at the initial end of tank 1, which is adjustable in its height and which may be entirely detached from the tank. The houndary surface between unminced and minced cheese mattresses in the tank 1 is indicated by reference numeral 28. When the unminced cheese mattress has entirely left the tank 1 and returned into it in minced form, the stop plate 29 is removed and the cheese mattress is finally pressed with the aid of the press plate 11. The mattress is left under pressure for the desired length of time.

Upon completed pressing, the wire 8 is once more set in motion and the cheese mattress is cut with the cutter 33 into cheese blocks of desired size, which are received onto an appropriate conveyor (not depicted) and transferred into storage to ripen.

If cheese production on a small scale is concerned, the mincing device 12, conveyors 22–24 and salting device 25 and the power cylinders 9 and 10 may be permanently mounted as in FIG. 1. But if large production is concerned, involving several tanks 1, as has been shown in FIG. 2, then it is advantageous to arrange the above-mentioned devices or part of them to be movable. The devices are moved next to the tank in connection with which they are needed at any given time. On the other hand the said devices may be stationary, but with the aid of conveyors transports are accomplished from different tanks in turn to these devices and back to the tanks.

According to the drawing the salting device 25 has been placed at the initial end of tank 1. But the salting device may also be placed immediately after the mincing device 12, that is, the conveyor extending from the ultimate to the initial end of the tank will be located between the salting device and the initial end of the tank. It is obvious to anyone skilled in the art on the basis of the foregoing that different embodiments of the invention may naturally vary within the scope of the claims presented below. It is essential from the viewpoint of the invention that a given kind of tank 1 is utilized, into which the cheese comes twice during the course of manufacturing and in which it is both times handled in the form of a continuous, large mattress.

We claim:

1. Apparatus for manufacturing cheese of the Cheddar-type comprising tank means for processing cheese having an inlet end and on outlet end, perforated means associated with said tank means for enabling fluid drainage from cheese located within said tank means, first conveyor means located within said tank means for passing cheese from within said tank means through said outlet end, press means located within said tank means for compressing a cheese mass located therein, mincing means located near said outlet end for cutting cheese which has been passed from within said tank means, salting means located exteriorly of said tank means for salting cheese, and second conveyor means for feeding cut cheese which has been discharged from said outlet end through said salting means and back to said inlet end to reintroduce said salted cheese back into said tank means whereby said cheese may be processed by being at least twice passed through said tank means.

2. Apparatus according to claim 1, wherein said first conveyor means comprises a movably driven perforated endless conveyor belt forming within said tank means a bottom surface upon which said cheese is supported, and wherein said press means comprise a pressure plate located above said first conveyor means and actuatable to compress said cheese against said perforated endless belt.

3. Apparatus according to claim 1, wherein said salting means is located proximate said inlet end of said tank means.

* * * * *